W. A. SCHMIDT AND E. R. WOLCOTT.
PROCESS AND APPARATUS FOR ELECTRICALLY ACCELERATING CHEMICAL REACTIONS.
APPLICATION FILED MAY 24, 1915.
1,307,930.
Patented June 24, 1919.
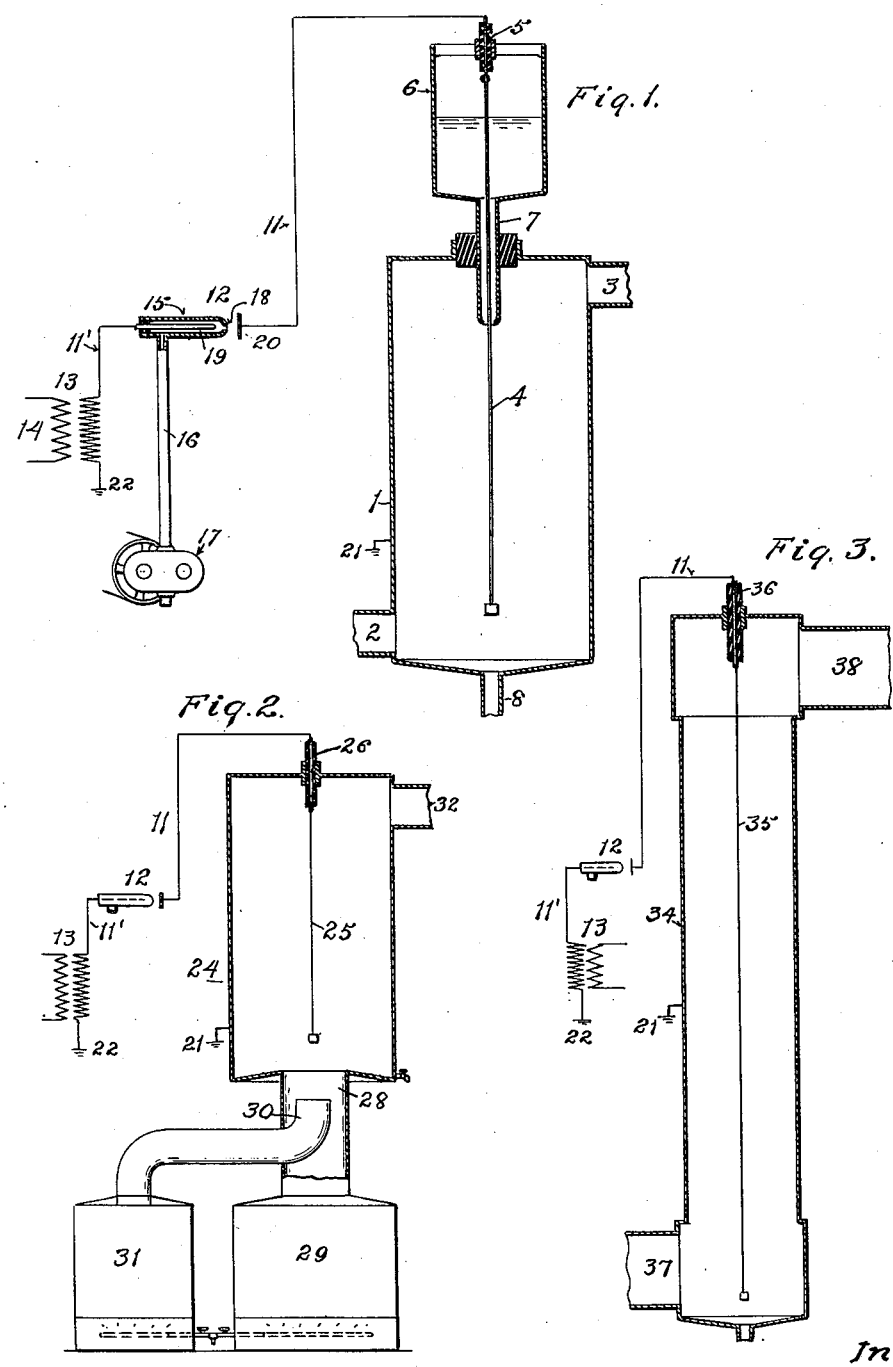
Inventors:
Walter August Schmidt
Edson Ray Wolcott.
by Arthur P. Knight
Atty

UNITED STATES PATENT OFFICE.

WALTER AUGUST SCHMIDT AND EDSON RAY WOLCOTT, OF LOS ANGELES, CALIFORNIA, ASSIGNORS TO INTERNATIONAL PRECIPITATION COMPANY, OF LOS ANGELES, CALIFORNIA, A CORPORATION OF CALIFORNIA.

PROCESS AND APPARATUS FOR ELECTRICALLY ACCELERATING CHEMICAL REACTIONS.

1,307,930.	Specification of Letters Patent.	Patented June 24, 1919.

Application filed May 24, 1915. Serial No. 30,037.

*To all whom it may concern:*

Be it known that we, WALTER AUGUST SCHMIDT and EDSON RAY WOLCOTT, citizens of the United States, residing at Los Angeles, in the county of Los Angeles and State of California, have invented a new and useful Process and Apparatus for Electrically Accelerating Chemical Reactions, of which the following is a specification.

This invention relates to the production or acceleration of chemical reactions or changes in substances contained in gases by the action of a high tension electric discharge, and the main object of the invention is to increase the effectiveness of such a discharge in accelerating chemical reaction. The substances contained in the gases may be gas or vapor constituents of such gases, or may be non-gaseous substances in contact with such gases.

A further object of the invention is to subject the gases or substances to be treated to the action of an electric field under such conditions that a maximum amount of electrical energy becomes available for absorption by the gases or other substance under treatment, without causing break down or disruption of the gas or other dielectric. This object we attain by subjecting the gases or substances to electric impulses of such high potential, as to produce a maximum ionization during short intervals of time, each impulse being of insufficient duration to cause breakdown of the gas or other dielectric medium.

We have discovered that the effectiveness of an electrical high tension discharge, in accelerating, producing or stimulating chemical reaction in a gas or other substance through which it is passed, can be greatly increased by setting up in the discharge circuit, surges or sudden impulses of high potential which are capable of dissipating a relatively large amount of energy in the substance in relatively short periods of time, without causing break down or disruption of the dielectric, and an important feature of our invention is the production of such surges for the purpose of increasing the chemical action. As a convenient means for producing such surges or sudden impulses of high potential in the electric circuit, we may use any device, for example, a rectifier, which causes sudden variation in the resistance of the circuit, under conditions that will result in production of an electric impulse presenting a steep wave front.

The accompanying drawings illustrate apparatus suitable for carrying out our invention, and referring thereto:

Figure 1 is a vertical section of an apparatus suitable for producing reaction between a gas and a liquid by our process.

Fig. 2 is a vertical section of an apparatus for producing reaction between two gases.

Fig. 3 is a vertical section of an apparatus for producing a chemical change in a gas by our process.

In applying our invention to the production or stimulation of reaction between a gas and a liquid, we may use the apparatus shown in Fig. 1, comprising a casing or chamber 1, formed, for example, as a vertical cylinder, having an inlet 2 and outlet 3, arranged to conduct a gas through the cylinder, for example, from the bottom portion to the upper part thereof. A liquid supply means consisting, for example, of a tank 6 on top of casing 1, is provided with an outlet, formed for example, as a pipe 7 extending through an insulating plug 9 in the top of casing 1. The casing 1 constitutes one electrode of the apparatus, and a discharge electrode 4 is mounted axially within said casing, said discharge electrode consisting, for example, of a fine wire hung from an insulated support 5 at the top of tank 6 and passing through the liquid supply pipe 7 so that the liquid from tank 6 will run down on the discharge electrode. An outlet 8 is provided at the bottom of casing 1, for draining off any liquid products of reaction that may be formed.

The above described electrodes 1 and 4 are connected in a high tension circuit including the secondary coil of a high tension transformer 13, whose primary winding is connected to an alternating current supply circuit 14, said high tension circuit also including a device 12 for modifying the current passing in the circuit so as to increase the chemical action in the treater. For this purpose we have found that the rectifier disclosed in the patent of E. R. Wolcott and F. Rieber, dated June 27, 1916, No. 1,188,597, is especially applicable, and the device 12 shown in Fig. 1 is of this type, comprising, for example a rod electrode 19, and an opposing electrode 20, formed for example as a plate, said electrode 19 being surrounded by a tube 15, connected by pipe 16 to means such as pump 17 for supplying compressed air, and said tube 15 having a contracted outlet 18 through which air is blown in the line of the discharge between electrodes 19 and 20. Electrode 4 of the treater may be connected by wire 11 to electrode 20 of the rectifier or device 12, and the electrode 19 of said device may be connected by wire 11′ to the high tension winding of transformer 13, the other side of said winding being grounded at 22 and the electrode 1 of the treater being also grounded as at 21.

Our invention may be applied to the acceleration of reaction between gases or vapors or between a gas or vapor and a liquid or generally to the acceleration of chemical reaction in or between substances in any state. The manner of carrying out the process, by the aid of the apparatus shown in Fig. 1, in the production or stimulation of reaction between a gas and a liquid, may be described as follows: The gas, for example, chlorin gas, is introduced at inlet 2, and passing upwardly through the casing 1, is subjected to the action of an electrical discharge between electrodes 4 and 1. At the same time, the liquid, for example, a liquid hydrocarbon such as petroleum or a product thereof, is supplied from tank 6 through pipe 7 and runs down on the electrode 4, the action of the high potential discharge from said electrode causing such liquid to be thrown from electrode 4 at high velocity and to pass in fine particles through the ascending gas and against electrode 1. By reason of the contact and mixture of the liquid and the gas thus produced, and by reason of the electric discharge produced at the same time through the gas, chemical action is accelerated between the liquid and the gas, for example, in the stated case of chlorin gas and a liquid hydrocarbon, the reaction my result in chlorination or the production of chlorin addition or substitution products. We have found that the amount of such reaction taking place is far greater when the rectifier or device 12 is used that when an alternating current is used without such device. The chemical effect is also much greater than when a rectifier such as a mechanical rectifier, adjusted for production of minimum arcing, is used. Any surplus liquid, or liquid reaction produced may be withdrawn through inlet 8. It will be understood, that in this, and in other applications of our invention, suitable conditions of temperature and pressure are maintained to produce the results.

Other gases or vapors may be caused to act on petroleum by the process above described, using the apparatus shown in Fig. 1, or other apparatus. For example, sulfur dioxid, and steam may be passed through said apparatus so as to receive an electrical discharge while in contact with the petroleum, and in all such cases we have found that the chemical reaction is greatly increased by the modifying of the current by the action of the device 12. We have also found that a discharge produced by impulses of this character exhibits exceptionally strong and extensive corona effects, the corona from the electrodes in such cases extending throughout the body of dielectric between the electrodes, instead of being substantially limited to the immediate vicinity of the electrodes. This indicates that electrical energy is being discharged into the dielectric with extreme rapidity.

In explanation of the action of the device 12 in producing a discharge which is more effective in accelerating chemical reactions, we have found that the effect of a device of the character above described is to produce sudden impulses of high potential and particularly to produce surges or oscillations, in the circuit in which it is connected. Each impulse or surge is of short duration, so that the energy of the surge is applied to the gaseous medium at excessively high potential during an extremely limited time, the excessively high potential resulting in excessive ionization and discharge while it lasts, and the shortness of the time preventing the ionization from accumulating so as to cause break down or disruption. It is characteristic of these surges that the potential differences presented thereby are much greater than the applied potential difference in the circuit, produced by the transformer, the surge being due to inductance effect resulting from sudden variation of the resistance of the circuit by breakdown of the gap at the device 12, between electrodes 19 and 20. Any other device capable of producing such surges or sudden impulses of high potential may therefore be used in place of the device shown at 12. It is essential to the successful carrying out of this invention that a substantial or considerable amount of the energy of the discharge shall consist of energy due to surging current or of suddenly varying current of steep wave front, and any device capable of producing this condition may be used. In this connection it may be stated that the conditions under which the apparatus is operated are not such as to produce sustained high frequency oscillations, as no provision is made for an oscillation circuit, including capacity and inductance means adapted to provide for resonance in a local discharge circuit. On the contrary, the impulses produced by the apparatus and which are found to be especially effective in dissipating energy into the gas, are in the nature of isolated impulses, in which substantially all of the energy of each impulse is delivered and dissipated in a single surge or wave and is not alternately stored and released as in the case of an oscillating current.

The construction of the treater may be varied according to the nature of the substances to be treated. Thus for accelerating reaction between two gases or vapors we may use the apparatus shown in Fig. 2, comprising a casing 24 constituting one electrode, and a wire 25 constituting the discharge electrode and supported by insulated support 26 in casing 24, said casing having an outlet 32, and provided with an inlet pipe 28, into which leads another inlet pipe 30, said pipes 28 and 30 leading respectively from boilers or vapor generators 29 and 31, for generating the vapors to be treated. The discharge and collecting electrodes are connected in circuit with transformer 13 and surge device 12 as above described, and the operation is the same as with the apparatus shown in Fig. 1, except that the two substances to be treated are both vapors and are introduced together through pipes 28 and 30 and pass upwardly through the electric discharge zone in the apparatus, so as to be subjected to the discharge while in contact with each other thereby accelerating reaction between them.

In case a single gas, or gases, already mixed, such as hydrocarbon gases, is to be subjected to the process the apparatus shown in Fig. 3 may be used, comprising a casing 34, in which the discharge electrode 35 is suspended from insulated support 36, connected to the circuit provided with means for producing high potential surges as above described, said casing 1 having inlet 37 and outlet 38 for passing the gas or gases therethrough.

We have also applied the above described process to the treatment of petroleum vapors for the purpose of cracking the same. For this purpose such vapors may be passed through the treater shown in Fig. 3 in the same manner as above described, and the surging electrical discharge passed through such vapors, with the result that the petroleum hydrocarbons are decomposed into different products under suitable conditions of temperature and pressure.

This application of our invention is not specifically claimed herein but forms the subject matter of an application, Ser. No. 157,812, filed March 27, 1917.

What we claim is:

1. The process of accelerating chemical changes in substances which consists in subjecting the substance to the action of an electric discharge produced by sudden impulses, each of such high potential that it would, if continued, break down the dielectric resistance of the substance, but such impulse being of such short duration as to prevent such break down.

2. The process of accelerating chemical reactions in substances which consists in subjecting such substances to the action of an electric discharge produced by impulses presenting a potential difference greater than the disruptive strength of the substance under steady potential difference.

3. The process of treating gases for producing chemical changes in substances contained therein, which consists in modifying an alternating high tension electric current by the action of a moving stream of gas interposed in the path of said current so as to produce intermittent impulses of high tension current, and applying the resulting intermittent high tension current to produce electrical discharge in the gases to be treated.

4. The process of producing chemical changes in substances which consists in producing high tension intermittent electric current in an electric circuit by intermittently varying the resistance of an alternating current circuit, passing a gas or vapor containing the substances to be treated, between electrodes and applying such intermittent high tension electric current to said electrodes to produce electric discharge into such gas or vapor.

5. The process of effecting chemical changes in substances which consists in intermittently producing sudden reduction of resistance of a high tension alternating current circuit, to produce high tension surging current in such circuit, applying such current to electrodes interposed in said circuit, and passing a gas or vapor containing the substances to be treated, between such electrodes.

6. The process of treating gases containing substances capable of chemical reaction for accelerating chemical changes in such substances, which consists in suddenly and intermittently lowering the resistance in a high tension electric circuit so as to produce in said electric circuit, surges of high tension current in such manner that the energy due to the surging constitutes a large part of the energy of the current in the circuit, and causing said current to produce electric discharge in said gases containing the said substances.

7. The process of producing chemical action in substances which consists in intermittently producing sudden variation in the resistance of a high tension alternating current, in such manner as to produce intermittent surging current in said circuit, and applying said intermittent surging current to a body of gas or vapor containing the substances to be acted on.

8. The process of producing chemical action in substances, which consists in producing in a gas or vapor in the presence of such substances, a high tension intermittent electric discharge, produced by intermittently effecting sudden variations of resistance in a high potential alternating current circuit.

9. The process of effecting chemical reactions in gases which consists in intermittently producing sudden variations of resistance in an alternating current circuit including a body of such gases, in such manner as to produce intermittent oscillating current in said circuit, and resultant discharge of electricity into said gases.

10. The process which consists in intermittently varying the resistance in the path of a high tension electric current in such manner as to produce an intermittent oscillatory current, and causing such current to produce electric discharge in a gas or vapor, in the presence of a substance capable of reacting with a constituent of such gas or vapor under the influence of such electric discharge.

11. An apparatus for electrical treatment of a gas to accelerate chemical action therein, comprising electrodes exposed to the gas, a circuit connected to said electrodes and to a source of high tension alternating current, and a circuit controlling device included in said circuit and adapted to suddenly decrease the resistance of the circuit under conditions which will result in production of surging current in the circuit.

12. An apparatus for accelerating chemical action in gases, comprising electrodes exposed to the gas, an alternating current circuit connected to said electrodes and to a source of high tension alternating current and a device included in said circuit comprising electrodes connected to the circuit, and means for passing an air-blast in the space between the last named electrodes, to control the passage of current therebetween.

In testimony whereof we have hereunto set our hands, at Los Angeles, California, this 10th day of May, 1915.

WALTER AUGUST SCHMIDT.
EDSON RAY WOLCOTT.